United States Patent [19]
Ogawa et al.

[11] Patent Number: 5,900,320
[45] Date of Patent: May 4, 1999

[54] FOAMED PLASTIC AND METHOD OF MANUFACTURING THE SAME

[75] Inventors: Kazufumi Ogawa, Nara; Tadashi Ohtake, Neyagawa, both of Japan

[73] Assignee: Matsushita Electric Industrial Co., Ltd., Osaka, Japan

[21] Appl. No.: 08/067,750

[22] Filed: May 26, 1993

[30] Foreign Application Priority Data

May 27, 1992 [JP] Japan .................................. 4-135381

[51] Int. Cl.$^6$ ...................................... B32B 15/08
[52] U.S. Cl. .................... 428/457; 428/458; 428/461; 428/463; 521/56; 521/59; 521/60; 521/98; 521/131; 521/132; 521/135; 521/136; 521/137; 521/138; 521/139; 521/178; 521/179; 521/180; 521/181
[58] Field of Search .................. 521/98, 131, 56, 521/59, 60; 428/457, 458, 461, 463

[56] References Cited

U.S. PATENT DOCUMENTS

| | | | |
|---|---|---|---|
| 2,928,130 | 3/1960 | Gray | 521/79 |
| 2,956,960 | 10/1960 | Nemplios | 521/79 |
| 3,386,926 | 6/1968 | Gaboret | 521/56 |
| 3,976,605 | 8/1976 | Matsunaga et al. | 521/146 |
| 4,181,781 | 1/1980 | Chandalia et al. | 521/146 |

OTHER PUBLICATIONS

Database WPI, JP-A-52 016 597 (Mitsui Fluoro. Chem.), Feb. 7, 1977 Abstract.
Database WPI, JP-B-46 037 899 (Agency of Industrial Science & Technology), Nov. 8, 1971 Abstract.
Database WPI, JP-A-44 019 394 (Daikin Kogyo Co. Ltd.), Aug. 22, 1969 Abstract.

*Primary Examiner*—Morton Foelak
*Attorney, Agent, or Firm*—Morrison & Foerster LLP

[57] ABSTRACT

The present invention aims to improve soundproof and heat insulating properties of a foamed plastic by reducing internal cells pressure inside foamed resins. A base polymer such as a polyester-based polyol and a volatile foaming agent having an conjugate unsaturated group (i.e., conjugate double carbon bonds and/or triple carbon bonds) such as chloroprene (bp. 51° C.) and calcium stearate were blended and then mixed with a hardening agent such as hexamethylene diisocyanate. The volatile foaming agent existing in open cells of the foamed plastic sealed in the Al laminated film and between the film and the foamed plastic, i.e., gap, possesses an unsaturated group, such as isoprene. Thus polymerization may occur by irradiating with electron rays, and the inside of the foams and the gap region may be reduced in pressure while the bag of the laminated film retains its shape.

7 Claims, 1 Drawing Sheet

FIG. 1(a')

FOAMED PLASTIC AND METHOD OF MANUFACTURING THE SAME

FIELD OF THE INVENTION

The present invention relates to foamed plastic which contains open cells and/or closed cells. More particularly, the invention relates to foamed plastic containing cells whose internal pressure is reduced, and which have an excellent soundproof performance and heat insulating effect in foamed plastics. A method of manufacturing the same is also disclosed.

BACKGROUND OF THE INVENTION

It is known that properties of plastics such as heat insulation, sound absorption, buoyancy, elasticity and weight reduction are improved by mechanically foaming plastics, involving foaming by using reactive gas or foaming by using foaming agents. Such foamed plastics are widely used as soundproof material, heat insulators, building material, lightweight structural material, packaging material, insulating material, cushion material, quakeproof material, footwear, automobile interiors, and other articles. Many usable resins are known, and various foaming techniques are also known.

To save energy, resources and space, it is desirable to improve heat insulation and soundproof performance with a material that is as thin as possible.

However, in the prior art, it has proved very difficult to reduce the thickness of formed resins. The heat insulation or soundproof performance of foamed resins decrease in proportion to a reduction in their thickness.

SUMMARY OF THE INVENTION

The present invention provides foamed plastic whose heat insulating properties and soundproof performance are improved by reducing internal pressure of the cells contained in foamed plastics or maintaining a vacuum inside them, and providing a method of manufacturing the same.

According to a first aspect of the invention, a foamed plastic containing closed cells, wherein a foaming monomer having a conjugate unsaturated carbon group is contained in the close cells wherein the foaming monomer is reacted to form an oligomer having more than a dimer, or to form a polymer.

It is preferable in this invention that the foamed plastic is made from a resin selected from the group consisting of polystyrene, vinyl chloride, polyurethane, phenol resin, urea resin, epoxy resin, polyethylene and acrylic acid resin.

It is preferable in this invention that the aluminum is deposited on a surface of the formed plastic.

It is preferable in this invention that the unsaturated carbon group is selected from the group consisting of double carbon bonds and triple carbon bonds.

According to a second aspect of the invention, a foamed plastic containing cells, wherein a foaming monomer having a conjugate unsaturated carbon group is contained in the cells inside the foamed plastic and between an airtight film and the foamed plastic, further wherein the monomers are reacted to form an oligomer having more than a dimer, or to form a polymer.

It is preferable in this invention that the airtight film is selected from the group consisting of (a) a laminate film of polyethylene and aluminum foil, (b) a laminate film of polyester, aluminum foil and polyethylene, or (c) a foamed plastic resin selected from the group consisting of polystyrene, vinyl chloride, polyurethane, phenol resin, urea resin, epoxy resin, polyethylene and acrylic acid resin.

It is preferable in this invention that the unsaturated carbon group is selected from the group consisting of double carbon bonds and triple carbon bonds.

According to a first manufacturing method of the invention, a method of manufacturing foamed plastic containing closed cells comprising (a) foaming a mixture composition of a volatile and polymerizable liquid foaming agent, i.e., foaming monomer, having conjugate unsaturated groups, and a resin; and (b) heating or irradiating the foamed plastic with an energy beam to react the volatile and polymerizable liquid foaming agents to make an oligomer having more than a dimer or a polymer inside of closed cells.

It is preferable in this invention that the foaming agent contains a halogen.

It is preferable in this invention that the plastic resin is selected from the group consisting of polystyrene, vinyl chloride, polyurethane, phenol resin, urea resin, epoxy resin, polyethylene and acrylic acid resin.

It is preferable in this invention that the unsaturated carbon group is selected from the group consisting of double carbon bonds and triple carbon bonds.

According to a second manufacturing method of the invention, a method of manufacturing foamed plastic containing closed cells comprising (a) foaming a mixture composition of a volatile and polymerizable liquid foaming agent having conjugate unsaturated carbon groups and a resin, (b) heating or irradiating the foamed plastic with an energy beam to polymerize of the agent, and (c) depositing metal on a surface of the foamed resin.

According to a third manufacturing method of the invention, a method of manufacturing foamed plastic containing closed cells comprising (a) foaming a mixture composition of a volatile and polymerizable liquid foaming agent having conjugate unsaturated carbon groups and a resin, and (b) deairing and sealing by using airtight film, and (c) heating or irradiating the foamed plastic with an energy beam to polymerize the volatile and polymerizable foaming agent existing in the open cells or closed sells inside the foamed plastic and between the foamed plastic and the airtight film, wherein the foamed plastic is sealed by the airtight film.

It is preferable in this invention that the foaming agent contains a halogen.

It is preferable in this invention that the airtight film is a laminate film consisting of polyethylene and aluminum foil or of polyester, aluminum foil and polyethylene, and the foamed plastic is selected from the group consisting of polystyrene, vinyl chloride, polyurethane, phenol resin, urea resin, epoxy resin, polyethylene and acrylic acid resin.

It is preferable in this invention that the unsaturated carbon group is selected from the group consisting of double carbon bonds and triple carbon bonds.

According to a first aspect of a foamed plastic of the invention, soundproof performance and heat insulating properties can be improved by reducing pressure inside of closed cells contained in the foamed plastics. Further, the heat radiation can be decreased by covering a surface of foamed plastics with a thin metallic film.

According to a second aspect of the foamed resin of the invention, soundproof performance and heat insulating properties of the foamed plastic can be improved in durability when the entire surface of the foamed plastic is covered with airtight film.

According to the three disclosed methods of manufacturing foamed plastic, reduced pressure is maintained inside of the closed cells and/or airtight film, and the foamed plastic of the invention can be manufactured efficiently.

DETAILED DESCRIPTION OF THE INVENTION

Figure 1A:
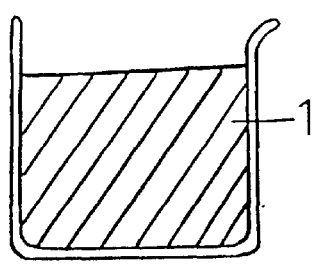
FIGS. 1(a), 1(a'), 1(b), 1(c) and 1(d) show schematically in sectional view the process for manufacturing formed polyurethane in accordance with the invention.
Figure 1B:
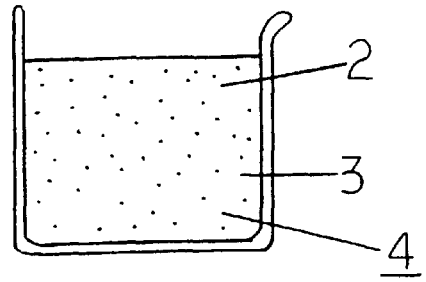
Figure 1B:
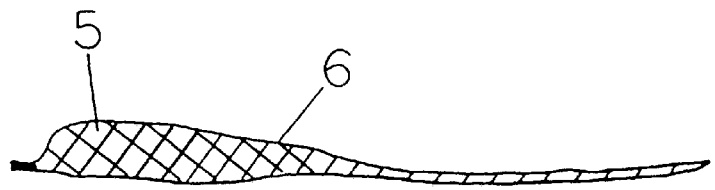

Details of the invention will be described concretely using examples.

The foamed plastic of the invention may be roughly classified by two types. One manufacturing method of the foamed plastic comprises using a volatile and polymerizable liquid monomer having conjugate unsaturated carbon groups as a foaming agent, i.e., a liquid foaming monomer, a step of foaming after mixing composition the foaming agent and resin, and a step of heating the foamed plastic to polymerize the volatile and polymerizable liquid monomer having conjugate unsaturated carbon groups (i.e., conjugate double carbon bonds and/or triple carbon bonds) existing inside the closed cells, thereby producing a foamed plastic having excellent soundproof and heat insulating properties.

The other manufacturing method of foamed plastic comprises, using a volatile and polymerizable liquid monomer as a foaming agent, a step of thermally foaming after mixing composition of a volatile and polymerizable liquid monomer having conjugate unsaturated carbon groups and plastic resin at liquid condition, a step of irradiating the foamed plastic with an energy beam (e.g. an electron beam, X-rays, gamma rays) to polymerize the volatile and polymerizable liquid monomer having conjugate unsaturated carbon groups existing inside closed cells of the foamed plastic is performed, thereby producing a foamed plastic excellent in soundproof and heat insulating effects.

Furthermore, by using the foaming monomer having conjugated double or triple carbon bonds such as

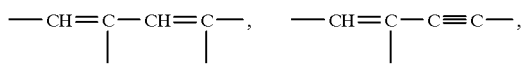

and —C≡C—C≡C—, it is possible to easily polymerize and solidify by energy beam irradiation or other convenient means. Further, by adding radical polymerization initiators such as benzoyl peroxide and azoisobutyronitrile, and inorganic halogen compounds such as stannic chloride and ferric chloride, the foaming monomer can be polymerized, and the internal pressure of the foamed plastics can be reduced.

Furthermore, when a metal is deposited on the surface of the foamed plastic, heat radiation may also be reduced more.

It is preferable in the invention that the foamed plastic is made from at least one resin selected from the group consisting of polystyrene, vinyl chloride, polyurethane, phenol resin, urea resin, epoxy resin and polyethylene acrylic acid resin.

An excellent soundproof and heat insulating foamed plastic sealed in an airtight film can be manufactured by mixing a volatile and polymerizable liquid foaming monomer having conjugated unsaturated carbon groups and a resin, and deairing and sealing by using airtight film and at least heating or irradiating the foamed plastic with an energy beam to polymerize the volatile and polymerizable foaming monomer existing in the open cells and/or closed sells inside the foamed plastic and between the foamed plastic and the airtight film. The film is also airtight and the foamed plastic is air sealed.

It is preferable in the invention that if a volatile and polymerizable monomer contains a halogen, a flame resistant property will be provided, increasing safety.

It is preferable in this invention that an airtight film is an Al laminate film consisting of polyethylene and aluminum foil or consisting of polyester, aluminum foil and polyethylene, and the foamed plastic comprises at least one selected from the group consisting of polystyrene, vinyl chloride, polyurethane, phenol resin, urea resin, epoxy resin, polyethylene and acrylic acid resin.

The embodiments are described below.

EXAMPLE 1
(A method of manufacturing heat-insulating foamed plastics containing closed cells)

The following are blended to prepare 80 g of forming hardening liquid:

(1) 30 g of a volatile foaming agent having conjugate bonds, such as cyclopentadien (b.p. 41° C.)

(2) 50 g of a hardening agent such as a hexamethylene diisocyanate (commercial products include Crude MDI, Crude TDI, Prepolymer MDI, Prepolymer TDI of Asahi Glass Co., among others).

This liquid was then mixed with 50 g of base polymer such as a polyester-based polyol, with an average molecular weight of about 2000, produced by the condensation polymerization of adipic acid (or phthalic anhydride) and ethylene glycol (or propylene glycol, glycerin, trimethylol propane, etc.) or a polyalkylene-based ether polyl, with an average molecular weight of about 2000, produced by the addition polymerization of ethylene oxide (or propylene oxide or butyrene oxide) and glycerin (or sorbitol). Theoretically, the mixing ratio of the alcohol group to isocyanate group should be nearly equimolecular. The mixture was immediately put into a foaming container about 5 cm depth, and the mixture was then foamed by heat of reaction within a few minutes (since the boiling point of the foaming agent is 41° C.), and was solidified, thereby producing foamed polyurethane containing closed cells.

The foamed urethane resin was then taken out from the foaming container, and left in an oven heated to 80° C. for one night. Two molecules of cyclopentadien were then bonded (coupled) to form dicyclopentadien (b.p. 170° C.; steam pressure at room temperature several mmHg) and the internal cell pressure was reduced to about 10 mmHg.

Prepared foamed polyurethane had an improved heat insulating characteristic about twice that of the starting material without heat polymerization. The soundproof effect was also improved about twice as much in comparison.

On the surface of thus obtained foamed polyurethane, heat radiation was considerably reduced, and the heat insulating effect was further enhanced, when a metal having a high heat reflecting effect, such as aluminum, was vacuum deposited at around 1000 Angstroms (100 nm) in thickness. Moreover, when irradiated with electron rays after exhausting air and sealing with an Al laminate film after foaming, the durability was enhanced together with the heat insulating effect.

Furthermore, by adding a surface active agent of several percent of dimethyl siloxane as a foam shaping agent, the foam building force and foam stability were enhanced. To encourage the reaction of polyol and isocyanate, when a catalyst such as a tertiary amine (for example, pentamethyldietylene triamine) or organic tin (for example, dibutyl tin dilaurate) is added, resin formation is promoted.

In order to improve the properties mentioned, the polyol, hardening agent and foaming agent may be selected freely, or blends may be used. In particular, when using a blended monomer with a foaming agent, a copolymer is produced by the energy beam irradiation, and the pressure-reducing effect is enhanced.

EXAMPLE 2

(A method of manufacturing heat-insulating foamed plastics containing closed cells)

The following are first blended to prepare 80 g of foaming hardening liquid:

(1) 30 g of a volatile foaming agent having conjugate bonds such as isoprene (bp. 34° C.)
(2) 50 g of a hardening agent such as a hexamethylene diisocyanate (commercial products include Crude MDI, Crude TDI, Prepolymer MDI, Prepolymer TDI of Asahi Glass Co., among others).

This liquid was then mixed with 50 g of base polymer such as a polyester-based polyol, having an average molecular weight of about 2000 produced by the condensation polymerization of adipic acid (or phthalic anhydride) and ethylene glycol (propylene glycol, glycerin, trimethylolpropane, etc.) or a polyalkylene-based ether polyol, having an average molecular weight of about 2000, produced by the addition polymerization of ethylene oxide (propylene oxide, butyrene oxide, etc.) and glycerin (or sorbitol) Theoretically, the mixing ratio of the alcohol group to isocyanate group should be nearly equimolecular. The mixture was immediately put into a foaming container about 5 cm depth, and the mixture was then foamed by heat of reaction within a few minutes (since the boiling point of the foaming agent is 34° C.), and was solidified, thereby producing foamed polyurethane containing closed cells.

Later, the urethane resin was taken out from the foaming container, and irradiated with about 0.01 to 10 Mrads of electron beam (preferably 0.2 to 1 Mrads) accelerated to about 800 KeV. The foamed resin thickness was about 5 cm, and electron rays penetrated this sufficiently, and isoprene, which is a volatile and polymerizable liquid foaming agent having conjugated two double bonds in the molecule, in closed cells was polymerized by the electron beam irradiation, and thus the pressure of individual closed cells was reduced to about several mmHg.

The foamed polyurethane prepared in this way had an improved heat insulating characteristic about twice that of the starting material without irradiation. The soundproof effect was also improved about twice as much in comparison.

On the surface of thus obtained foamed polyurethane, when a metal of high heat reflecting effect such as aluminum was vacuum deposited at around 1000 Angstroms (100 nm), heat radiation was considerably reduced, and the heat insulating effect was further enhanced. Moreover, when irradiated with electron rays after sealing with an Al laminate film in a vacuum after foaming, the durability was enhanced together with the heat insulating effect.

Furthermore, by adding a surface active agent of several percent of dimethyl siloxane as a foam shaping agent, the foam building force and foam stability were enhanced. To encourage the reaction of polyol and isocyanate, when a catalyst such as a tertiary amine (for example, pentamethyldiethylene triamine) or organic tin (for example, dibutyl tin dilaurate) is added, resin formation is promoted.

In order to improve the properties mentioned, the polyol, hardening agent and foaming agent may be selected freely, or blends may be used. In particular, when using a blended monomer with a foaming agent, a copolymer is produced by the irradiation, and the pressure-reducing effect is enhanced.

Examples of volatile and polymerizable liquid foaming agents having conjugated carbon bonds, except for isoprene, are as follows.

(1) cyclopentadiene ($C_5H_6$; bp. 41° C.)
(2) hexatriene ($CH_2$=CH—CH=CH—CH=$CH_2$; bp. 78° C.)
(3) isopropenyl acetylene (Formula 1; bp. 31° C.)

(Formula 1)

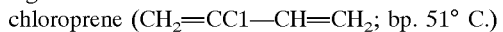

Further, an example of foaming agents containing a halogen is as follows:

chloroprene ($CH_2$=CCl—CH=$CH_2$; bp. 51° C.)

In case of using a foaming agent having a boiling point higher than 60° C., it is necessary to heat to about 100° C. after mixing with a hardening agent containing polyol and the foaming agent.

EXAMPLE 3

(A method of manufacturing heat-insulating foamed plastics containing closed cells)

As shown in FIG. 1, the following are blended to prepare 85 g of foaming hardening liquid 4:

(1) 30 g o f a volatile foaming agent 2 having conjugated bonds such as chloroprene (bp. 63° C.) (or, hexatriene (bp. 78° C.)), and
(2) 5 g of calcium stearate
(3) 50 g of a hardening agent 3 such as hexamethylene diisocyanate (FIG. 1 (a)).

This liquid was then mixed with 50 g of base polymer such as a polyester-based polyol 1, having an average molecular weight of about 2000, produced by the condensation polymerization of adipic acid (or phthalic anhydride) and ethylene glycol (propylene glycol, glycerin, trimethylolpropane, etc.) or a polyalkylene-based ether polyol, having an average molecular weight of about 2000, produced by the addition polymerization of ethylene oxide (propylene oxide, butyrene oxide, etc.) and glycerin (or sorbitol). Theoretically, the mixing ratio of the alcohol group to isocyanate group should be nearly equimolecular. The mixing liquid 5 was immediately put into an Al laminate film bag 6, which was then deairated and sealed (FIG. 1(b)).

Figure 1C:
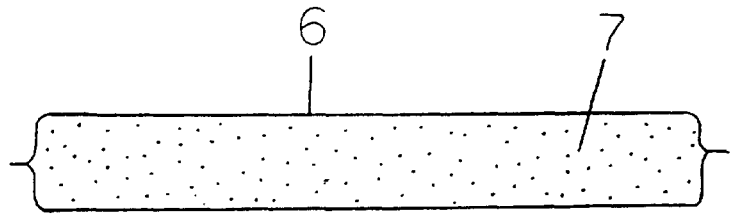
Figure 1D:
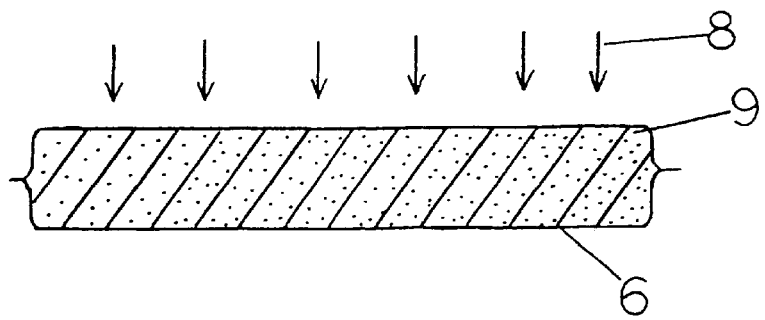

Then, bounded by a heating panel with a gap of about 5 cm and heated at about 100° C., the mixture was foamed in several minutes and cured, and polyurethane-type foam resin 7 sealed hermetically to form a heat insulating material, having open cells, was produced (FIG. 1(c)).

Later, the covered heat-insulating resin was removed from the heating plate, and irradiated with about 1 Mrad of electron beam 8 accelerated to about 800 KeV. The resin thickness was about 5 cm, and electron rays penetrated this sufficiently, and the volatile foaming agent having the conjugated bonds (such as isoprene) existing in open cells in the Al laminated film and between the film and foamed polyurethane resin could be polymerized by the electron beam irradiating. The inside of the foams and the gap region were reduced in pressure while the bag 9 retained its shape (FIG. 1(d)).

The foamed polyurethane heat-insulating plastic prepared this way had an excellent heat insulating characteristics improved by about three times compared with the plastic receiving no irradiation with electron rays. The soundproof effect was also improved by about three times as much in comparison.

Furthermore, the inside of the foamed polyurethane can be reduced in pressure more efficiently by adding 1 wt % of stannic chloride to the foaming agent as a polymerization catalyst, as the foaming agent can be easily polymerized by heat after foaming.

Aside from the above embodiments, a foamed polystyrene resin (having closed cells) may be prepared by adding a volatile foaming agent possessing conjugated bonds, such as isopropennyl acetylene, to polystyrene, and holding the combination in heating plates at about 120° C. with a gap of about 5 cm, and foaming for several minutes and curing. By controlling the concentration of foaming agent in the resin and adding a surface active agent, the foamed polystyrene having either closed cells or open cells may be prepared as desired.

After removing the foamed polystyrene from the heating plate by hand, and irradiating it with about 0.01 to 10 Mrads of electron beams accelerated to about 800 KeV, at the thickness of about 5 cm, electron rays penetrated sufficiently. The volatile foaming agent possessing conjugated bonds such as isopropennyl acetylene in the closed cells was polymerized by electron rays, so that the inside of the individual foams could be reduced in pressure.

By mixing the volatile foaming agent possessing the conjugated bonds such as cyclopentadiene in the vinyl chloride resin, and heating at about 200° C., foamed polyvinyl chloride having closed cells is prepared. By controlling the concentration of foaming agent in the resin and adding a surface active agent, foamed polyvinyl chloride having either closed cells or open cells may be manufactured as desired.

Upon removing the foamed polyvinyl chloride from the heating plate by hand, and irradiating it with about 0.01 to 10 Mrads of electron beams accelerated to about 800 KeV, the electron rays penetrate sufficiently, and cyclopentadiene i.e., the volatile liquid foaming agent possessing conjugated bonds in closed cells, is polymerized with electron rays, so that the inside of the individual closed cells may be reduced in pressure.

Furthermore, by preliminarily preparing resol type condensate or novolak condensate, and mixing with the volatile foaming agent having conjugated bonds, such as chloroprene, depositing in a mold, and heating to about 150° C., a foamed phenol resin having closed cells is prepared. Similarly, at this time, by controlling the concentration of the foaming agent in the resin and adding a surface active agent, foamed phenol resin having either closed cells or open cells may be manufactured as desired.

Upon removing the foamed phenol resin from the heating plate by hand, when irradiated with about 0.01 to 10 Mrads of electron beams accelerated at about 800 KeV, electron rays penetrate sufficiently, and the volatile foaming agent possessing conjugated bonds such as chloroprene in closed cells is polymerized by electron rays, and the insides of individual closed cells are reduced in pressure.

Aside from the resins used above, by employing urea resin, epoxy resin, polyethylene or acrylic acid resin, needless to say, foamed plastics with high performance in heat insulation and soundproofing may be similarly manufactured.

As has been shown, according to the invention, soundproof and heat insulating properties of a foamed plastic can be improved by reducing pressure in closed cells of foamed plastic, and in open cells of foamed plastic whose air is sealed with airtight film. Also, pressure existing in the closed cells and between the airtight film and the foamed plastic can be reduced.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A foamed plastic containing cells, comprising a foaming monomer having a conjugate unsaturated carbon group in the cells, wherein the foaming monomer is reacted to form an oligomer having more than a dimer, or to form a polymer.

2. The foamed plastic according to claim 1, wherein said foamed plastic is made from a resin selected from the group consisting of polystyrene, polyvinyl chloride, polyurethane, phenol resin, urea resin, epoxy resin, polyethylene and acrylic acid resin.

3. The foamed plastic according to claim 1, wherein aluminum is deposited on a surface of the formed resin.

4. The foamed plastic according to claim 1, wherein said unsaturated carbon group is selected from the group consisting of double carbon bonds and triple carbon bonds.

5. A foamed plastic containing cells, comprising a foaming monomer having a conjugate unsaturated carbon group is contained in the cells inside said foamed plastic and between an airtight film and said foamed plastic, further wherein the monomer is reacted to form an oligomer having more than a dimer, or to form a polymer.

6. The foamed plastic according to claim 5, wherein the airtight film is selected from the group consisting of (a) a laminate film of polyethylene and aluminum foil, (b) a laminate film of polyester, aluminum foil and polyethylene, or (c) a foamed plastic resin selected from the group consisting of polystyrene, vinyl chloride, polyurethane, phenol resin, urea resin, epoxy resin, polyethylene and acrylic acid resin.

7. The foamed plastic according to claim 5, wherein said unsaturated carbon group is selected from the group consisting of double carbon bonds and triple carbon bonds.

* * * * *